May 12, 1953 E. V. GORDON 2,638,181
MECHANISM FOR SEPARATING AIR-BORNE MATERIALS
Filed May 31, 1949 3 Sheets-Sheet 1

INVENTOR.
ELWIN V. GORDON
BY

May 12, 1953 E. V. GORDON 2,638,181
MECHANISM FOR SEPARATING AIR-BORNE MATERIALS
Filed May 31, 1949 3 Sheets-Sheet 3

INVENTOR.
ELWIN V. GORDON
BY Joseph B. Gardner
atty.

Patented May 12, 1953

2,638,181

UNITED STATES PATENT OFFICE 2,638,181

MECHANISM FOR SEPARATING AIR-BORNE MATERIALS

Elwin V. Gordon, San Leandro, Calif., assignor to Farm Production Engineers, Inc., Oakland, Calif., a corporation of California Application May 31, 1949, Serial No. 96,332

6 Claims. (Cl. 183—83)

This invention relates to separators of the cyclone type capable of discriminating between component materials in an airborne aggregation thereof by virtue of differences in the weights of respective components.

The present application is a continuation in part of my prior application Serial No. 39,314, filed July 17, 1948, and now abandoned.

An object of the invention is to provide a separator particularly adapted to the disassociation of mixtures in which only a slight degree of unit weight difference exists between the components such as, for example, grain kernels and the detached straw and hull fragments thereof.

Another object of the invention is to provide a separator for harvested crops such as grain, beans, peas and the like, which is capable of very rapid adjustment to maintain its separating efficiency whenever crop mixtures are encountered which do not properly disassociate under settings employed and found to handle satisfactorily previously processed crop mixtures.

A further object of the invention is to provide an improved cyclone separator, for disassociating grain kernels or similar seeds from harvest waste such as straw and chaff, which will not only effect, in one part of the mechanism, a major separation of the seeds from the waste components but will also continue to separate undesirable elements from the seed collection during the entire passage of the latter from the zone of major separation to the final repository for the seeds.

Still another object of the invention is to provide a cyclone separator, for disassociating mixture components of the character described, in which a plurality of independently controllable elements are provided capable of cooperatively establishing in the separator variably positionable zones at which material to be separated from the seed values is arrested in its progression with the latter and is thereupon capable of more ready and thorough removal.

Yet another object of the invention is to provide a cyclone separator for seed crops which, although capable of handling high velocity flows of seed and waste mixtures, effects separation and final delivery of the seeds in a manner sufficiently gentle as not to rupture, bruise or otherwise damage even the most delicate seeds.

A still further object of the invention is to provide a cyclone separator for seed and straw mixtures which is substantially incapable of being clogged with straw.

It is another object of the invention to provide, in a cyclone type of separator provided with an open bottom discharge port and capable of handling seed and straw mixtures of the character referred to, means for controlling entrance of air into the cyclone through the discharge port in such a manner that eddy currents occasioned by said air entrance are minimized and consequently the efficiency of separation of the seeds from the straw will not be impaired or otherwise interfered with.

It is still another object of the invention to provide a separator of the cyclone type in which air currents are caused to flow along unchoked paths which are smoothly continuous and devoid of abrupt, flow-resisting directional changes.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings.

Figure 1:
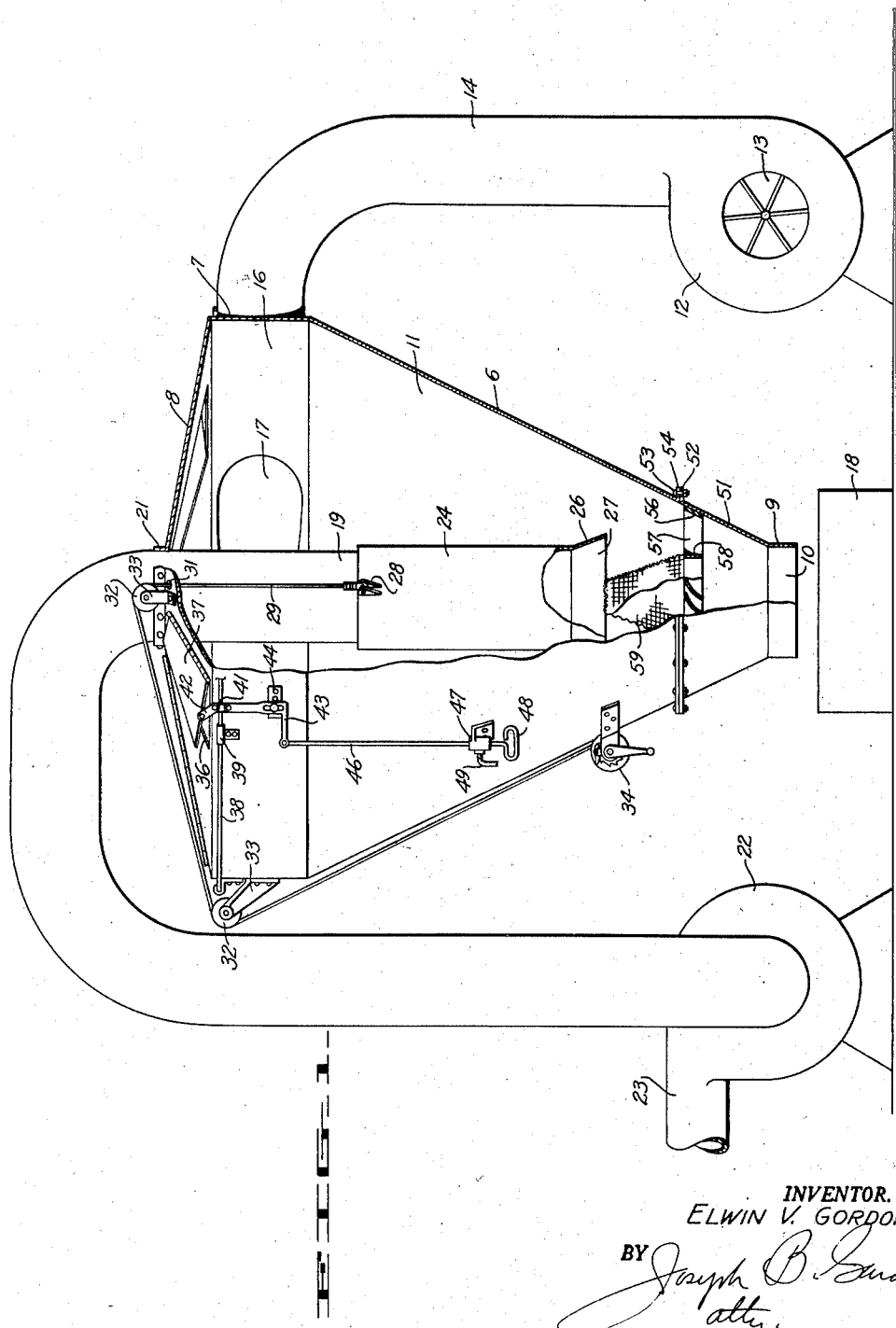
Figure 1 is a view, for the most part in side elevation, of the improved separator mechanism of my invention, portions of the view being broken away so as to more clearly disclose internal details of construction.

In carrying out my invention, I utilize the same basic apparatus disclosed in the above-identified prior application which comprises an axially vertical, conical cyclone shell 6 provided with a cylindrical upper head extension 7 having a transaxially disposed upper head plate 8 and tapering divergently downwardly to terminate at a cylindrical neck portion 9 which bounds a bottom discharge aperture 10 axially aligned with the chamber 11 within the cyclone shell. A centrifugal blower 12 is provided into the suction port 13 of which may be fed manually, or by any other suitable means, the harvested grain or other mixture in which separation of the other components is to be effected, the blower then discharging the mixture, or the seeds and straw whose relative detachment has been effected by the threshing action of the blower impeller, at high velocity through a material feed duct 14 which enters the chamber 11 tangentially in the upper cylindrical portion 16 thereof, bounded by the upper extension 7 of the cyclone shell, through a discharge port 17. The mass of material, which for the purposes of this disclosure comprises the mixture of straw and detached seeds, entering the chamber 11 in such a manner is caused to whirl at high speed therein and circumferentially thereof so that centrifugal force acting on the heavier components of the mass, in this case, the seeds, will cause the latter to work their way radially outwardly through the material mass until their outward movement is halted by engagement with the cyclone wall surface or with the peripheral layer of seeds previously deposited thereon. The lighter straw and other waste components will form the inner core zone of the whirling mass. Immediately upon entering the chamber 11 the mass of material will be acted upon by gravity which, in spite of its rotational velocity, will cause the mass, while still whirling, to gradually descend toward the discharge aperture 10 where the seeds alone will be allowed to pass through and be caught in a suitable receiver 18, here shown as a box but which may be a sack or other container.

Prevention of the greater portion of the straw and other waste components from reaching and passing outwardly through the discharge aperture 9 is effected by the provision of a suction duct 19 which enters the chamber 11 axially vertically thereof through an entrance collar 21, or the like opening, formed preferably centrally of the head plate 8, which terminates at its lower end at a point spaced above the discharge aperture 10 and whose opposite end is connected to the intake of a centrifugal suction blower 22. Operation of the suction blower 22, which is continuous as long as the separator is in operation and material to be separated is injected into the cyclone chamber by the blower 12, establishes not only a reduced air pressure in the bottom portion of the cyclone chamber 11 so as to hasten gravital descent of the whirling mass of material in the chamber but also induces an upward flow of external air through the discharge aperture 10 into the chamber 11 and also into the lower end of the suction duct 19. The resultant action of these air currents is to create, adjacent the plane of the lower end of the suction duct 19, a zone in which the descent of the core portion of the mass comprising the straw and other waste components is halted and brought under the influence of the suction draft to be thereupon drawn into the duct 19 and exhausted into the field as tailings through the discharge duct 23 of the suction blower. These air currents do not appreciably affect the outermost peripheral zone of the mass occupied by the seeds, the latter, without hindrance, moving downwardly along the inner wall surface of the shell 6 to pass through the discharge aperture 9 and fall into the receiver 18.

The above-described basic apparatus, while capable of being designed and proportioned efficiently to separate the components of a given mixture, such as a certain type of grain and its waste elements, may not function with the same degree of efficiency when used in the attempted separation of mixtures in the same class. This is due, in large measure, to variations in relative specific gravities between the seed and waste components of the mixture which a fixed relationship of the operating parts and air currents of the separator is incapable of meeting. In fact, even the characteristics of the particular crop that the machine was designed to separate may vary widely. This may be due to varying degrees of ripeness of the crop, in which the proportionate unit weights of the seeds and waste elements differs from that considered in the design of the separator, to humid atmospheric conditions in which reabsorption of moisture by the dried straw with little absorption by the seeds may disturb the balance, and to numerous other factors. The most common difficulties encountered under such conditions are persistent wadding of straw and waste elements in the throat of the suction duct 19, with the result that considerable waste matter is allowed to pass with the seeds into the collection receiver so that recleaning of the recovered seeds is necessary to place them in marketable condition, carrying of considerable quantities of seeds with the waste elements into the tailings, and a general decrease in output and efficiency due to the choked flow of the mixture through the separator.

I have, by numerous structural improvements, rendered previously proposed separators of this type capable of being rapidly adjusted to meet changing crop conditions so that the maximum efficiency of recovery may be achieved with a minimum of lost time and values. The phase of operation most affected by encountered changes in the relative unit weights of the seeds and waste elements is in the raising or lowering of the zone in the cyclone chamber at which the downward gravital movement of the waste mass is halted prior to the movement of the halted portions of the mass toward and into the suction duct throat. If this level is above the plane of the throat, due to the encountering of more buoyant waste elements than were previously successfully handled, the subsequently descending waste elements in the chamber may concentrate in the upwardly displaced zone and wad to the point wherein the discharge throat may be choked so as to cut off or disastrously reduce the suction draft. On the other hand, if the waste elements become weightier the arresting zone may fall so far below the suction duct throat that considerable amounts of the waste elements will not come within the upward impelling influence of the suction draft and consequently may either pass off with the seeds into the collection receiver or clog the discharge aperture so that seeds may not freely pass and the entering draft of atmospheric air may be interfered with and seriously reduced. In the improved structure of my invention, I provide on the lower end of the suction duct 19, within the cyclone chamber 11, an axially aligned and relatively slidable sleeve 24 having a frusto-conical downwardly-flared bell 26 at its lower end whose bottom perimetral edge 27 circumscribes and defines the plane of the suction duct throat and whose upper end portion is provided with two or more circumferentially spaced lugs 28 to which are attached in any suitable manner, the ends of vertically extending lift cables 29 which pass upwardly out of the cyclone chamber through suitable access openings 31 formed in the head plate 8, over suitable guide pulleys 32 which may be supported for rotation on brackets 33 carried by the head plate and outer rim portion of the cyclone housing, and thence to suitable means such as the manually operable winch 34 attached to a lower portion of the housing in convenient reach of the machine attendant. It will be seen therefore that by manipulating the winch 34, or other control means provided, the throat of the suction duct sleeve 24 may be raised or lowered as desired in the cyclone chamber to meet and compensate for changing conditions which may be encountered in the separation operations. For instance, if it is found that some straw or chaff is falling through the discharge aperture 10 with the recovered seeds, the arresting zone of the waste elements within the cyclone chamber may be too far below the suction duct throat. In this case a slight lowering of the sleeve 24, as indicated by the lower dotted line position in Figure 2, will establish the proper relationship between the aforesaid zone and the throat so that the vagrant straw or chaff will be picked up by the suction draft before it can descend out of the discharge aperture. Likewise, if the arresting zone is found to be too high, in relation to the discharge duct throat, as may be evidenced by a reduced output of straw or other waste in the tailings or by the presence therein of seeds carried off by the suction draft, a slight raising of the sleeve 24, as indicated by the upper dotted line position of Figure 2, to reestablish the correct relationship between the arresting zone and the suction duct throat will quickly restore proper operating conditions.

Figure 3:
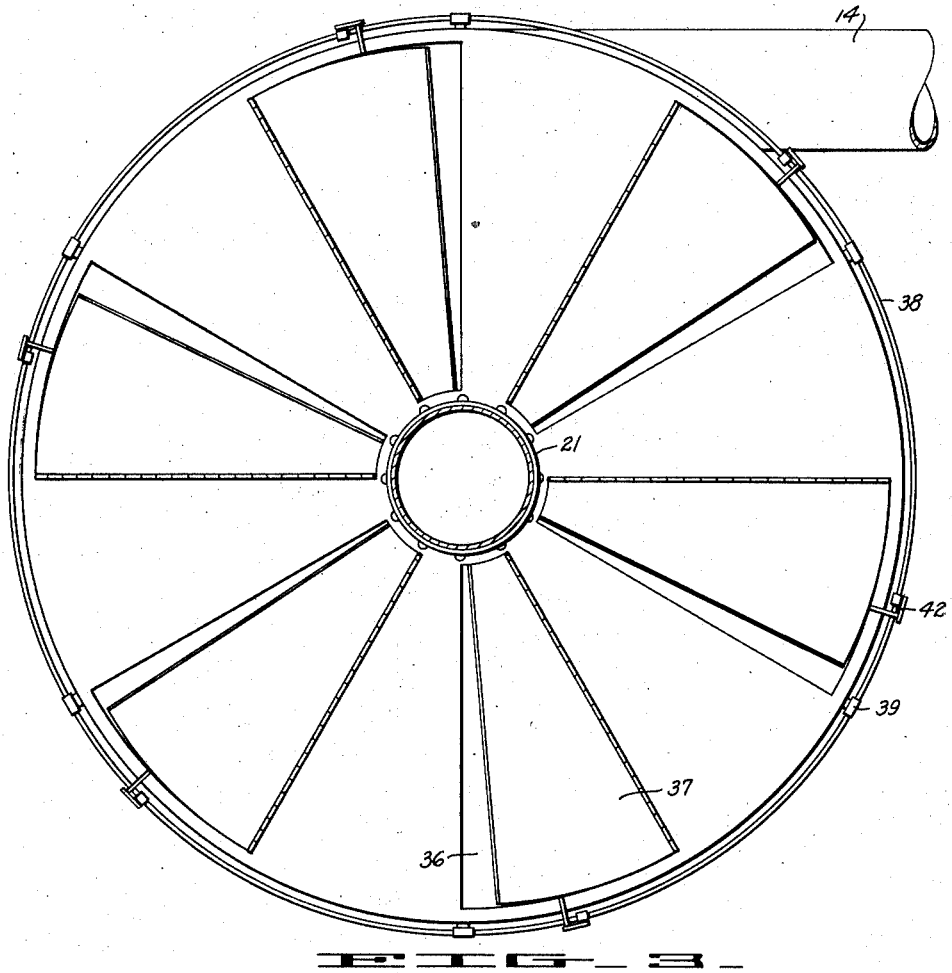
Figure 3 is a top plan view of the structure illustrated in Figure 2.
Figure 4:
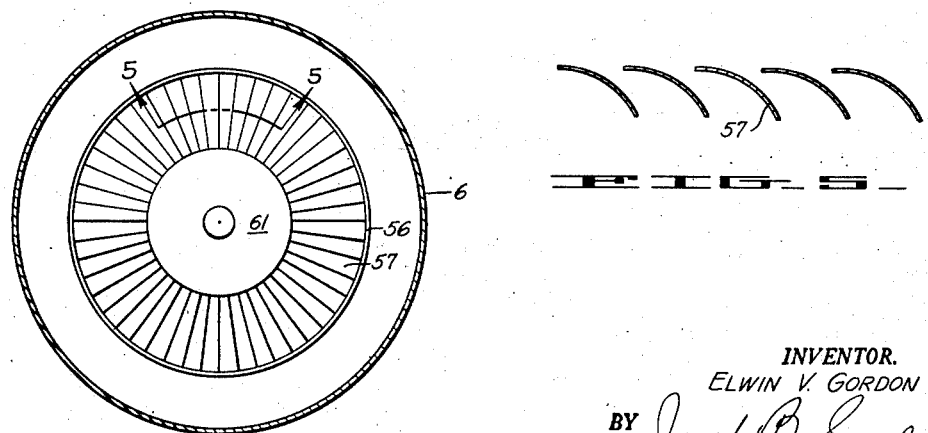
Figure 4 is a horizontal sectional view taken in the plane indicated by the line 4—4 of Figure 2.
Figure 5:
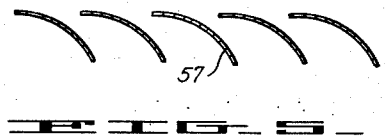
Figure 5 is an enlarged vertical sectional view taken in the plane indicated by the line 5—5 of Figure 4.

I have also provided means which may be operated independently of or in conjunction with the vertically adjustable suction duct sleeve 24 for varying the effective height of the waste material arresting zone in the cyclone chamber so as to modify the effect of gravity on the whirling mass of material in the chamber. As will be seen in Figure 3, I provide in the head plate 8, forming the top of the cyclone chamber, a plurality of radially-elongated ports 36, through which the upper portion of the cyclone chamber 11 is vented to the atmosphere and which are capable of being opened or closed by conforming with and constituting portions of the head plate 8. All of the shutters 37 are preferably connected together for movement in unison, this being accomplished in any suitable manner such as by the control ring 38 shown which is mounted concentrically with and for rotational movement about the upper portion 7 of the cyclone housing in suitable bearing guides 39 carried by the housing and which is fitted with circumferentially-spaced collars 41 between which and the shutters 37 connecting links 42 are pivotally disposed. Control means for positioning the control ring 38 may take any of several suitable forms, the mechanism herein shown comprising a bellcrank 43 mounted for pivotal movement on a bracket 44 suitably secured to the cyclone housing, having one arm thereof pivotally engaged with the ring 38 and having the other arm thereof similarly engaged with a vertically-extending rod 46 which passes slidably through a guide bracket 47 secured to the housing and which has at its lower end a hand grip 48 or the like by means of which the rod may be raised or lowered so as to correspondingly rotate the ring 38 and simultaneously close or open the shutters 37. A setscrew 49, or similar clamp means, is preferably provided in the guide bracket 47 so that the shutters may be fixedly locked in a selected position of adjustment. It will be noted, in Figure 3 particularly, and also in Figure 1, that the shutters 37 are hinged along the edge of each port 36 opposite to that side of the latter which is first traversed by the air current, and the flow of mixture to be separated carried thereby, as the latter circles within the cyclone chamber. Thus any partially opened shutter is angularly and rearwardly inclined relative to the direction of flow thereunder with the result that there will be no tendency for the newly entering air and entrained material through the inlet opening 17 to rise and possibly be ejected from the chamber through the ports 36 due to their close proximity to the inlet opening. In fact the relationship of the partially opened shutters to the underlying air flow is such that an injector action takes place and a flow of atmospheric air is induced to pass under the shutters and through the ports 36 into the cyclone chamber thus counter-acting any tendency of the air-entrained material to veer upwardly and out of the chamber. The shutters 37, when entirely closed, render the head plate 8 entirely impervious to the flow of atmospheric air therethrough and consequently the only air entering the cyclone chamber, aside from that entering through the lower discharge aperture 9 which passes substantially entirely into the suction duct 24 and 19, will be the stream which conveys the mixture to be separated through the material feed duct 14. As the body of material-conveying air is forced downwardly in the cyclone chamber by the subsequently-entering air flow, the density of the said air body will increase as the cross-sectional area of the chamber becomes more and more contracted. This compaction of the air mass will have a maximum buoyant effect on the entrained material and will tend to counter-act the gravital descent of the latter at a higher zone in the chamber than would be the case if a lesser density of the underlying air mass existed. By gradually opening the shutters 37, air pressure in the upper portion of the cyclone chamber may be selectively reduced so as to lessen the buoyant effect of the lower air mass on the entrained material. Thus the entrained material may be caused to settle bodily in the chamber by the alteration in the balance between the forces of gravity and buoyancy effected by the degree of opening of the shutters and consequently the lower zone of the waste material mass may be brought into any desired relationship with the throat plane 27 of the suction duct. Conversely, if batches of material should appear during a separation run, which have greater buoyancy than batches previously processed and for which the mechanism has been accommodatively adjusted, the lower zone level of the lighter material will be established at a higher plane in the separator chamber. This may be rapidly compensated for by either a slight opening of the shutters 37 or a slight elevation of the sleeve 24, or any combination of these adjustments.

Figure 2:
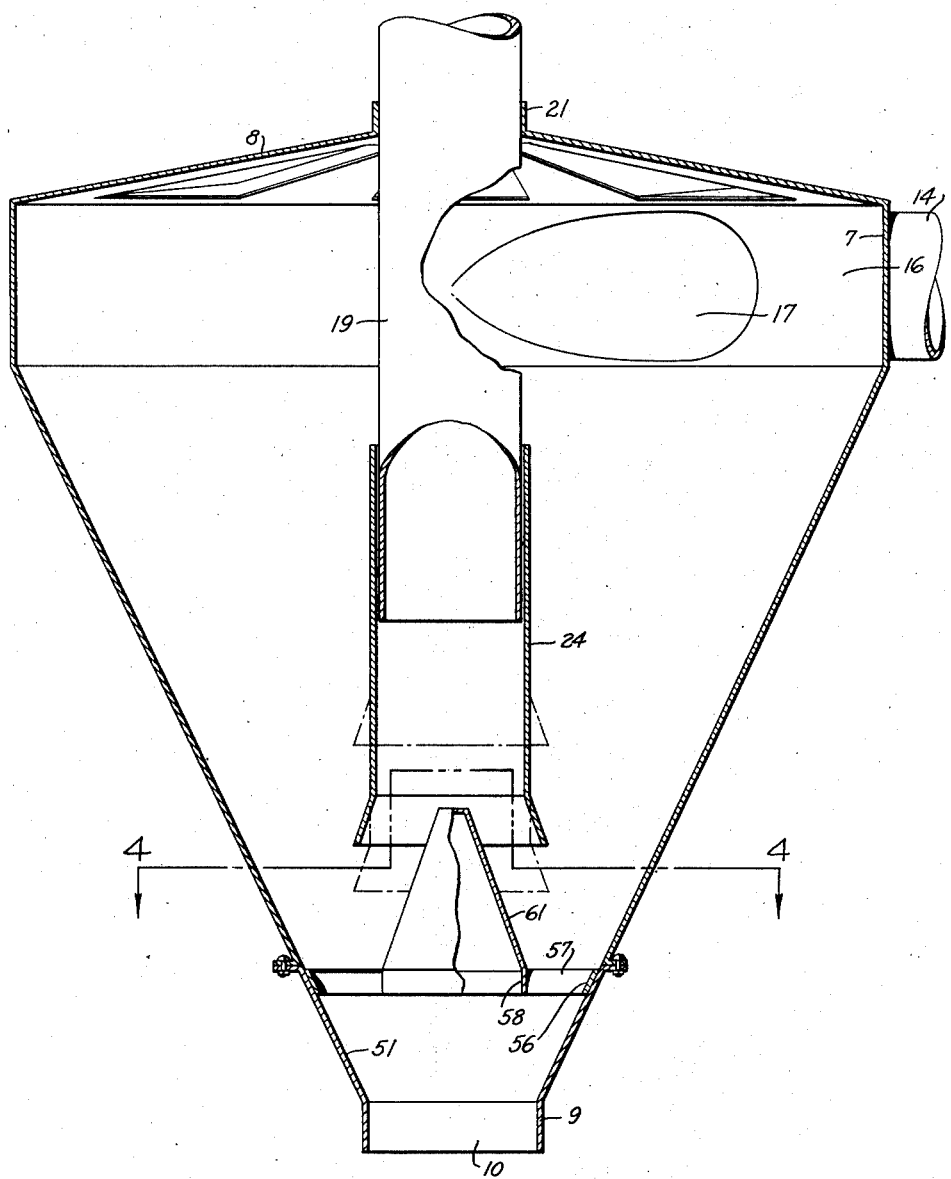
Figure 2 is an enlarged scale vertical sectional view taken in a plane coinciding with the vertical axis of the cyclone.

In previously proposed cyclone separators of this type, the induced flow of air, which was caused to enter the cyclone chamber through the lower discharge aperture 9 by the evacuating draft in the suction ducts 19 and 24, was allowed to pass freely into the suction duct throat. Due to the fact that the air mass in the chamber, entraining the material to be separated, is whirling as it approaches the discharge aperture, the straight-flowing stream of air entering upwardly through the discharge aperture will angularly traverse the whirling mass. This causes considerable turbulence and eddy currents at the discharge aperture and the efficiency of operation of the separator is not only reduced but oftentimes seeds which should properly pass along the inner periphery of the aperture into the collection receiver 18 are thrown radially inwardly of the aperture, caught in the ascending air draft and carried away in the tailings with the waste material drawn into and discharged through the suction duct 19. I have overcome this deficiency by an improved structural arrangement of the lower end of the cyclone housing at and immediately adjacent to the discharge aperture. One form of this improved arrangement is illustrated in Figure 1 while a modified form thereof is shown in Figure 2, the operational characteristics and advantages of which will be separately explained. In Figure 1 it will be seen that I have provided the lower end of the cyclone housing 6 with a frusto-conical detachable spout 51 shaped to correspond with and to form a coplanar extension of the housing side walls and provide along its upper edge with a peripheral flange 52 engageable, by means of suitable bolts 53 or the like, with a corresponding flange 54 carried by and encircling the lower end of the housing. The spout 51 here shown terminates at its lower end at the neck portion 9 which bounds the discharge aperture 10. Thus the various elements comprising the discharge aperture 10, the spout 51 and the upper cyclone housing 6 are all in vertical axial alignment. Seated in the upper portion of the spout 51 and arranged for ready detachment therefrom upon disconnection of the spout from the cyclone housing, is a baffle unit comprising a frusto-conically shaped outer ring 56, shaped to conform with and nest against the inner wall surface of the spout, which has attached thereto a plurality of inwardly radiating and peripherally spaced vanes connected at their inner ends with a cylindriform inner ring 58 to which is connected an upwardly-converging conically-shaped baffle member 59 axially concentric with and projecting toward the suction duct throat. The vanes 51 are vertically inclined so that their upper horizontal and radially-extending edges are advanced, in respect to the positions of their lower edges, in the direction in which the mass of air and entrained material in the cyclone chamber is whirling so that air coming upwardly through the discharge aperture 9 will be diverted from its vertical path by the vanes and will be directed into the cyclone chamber in a path which more nearly approximates the path along which the main body of air and entrained material within the chamber is moving. Thus the tendency toward creation of turbulence and eddy currents at or immediately above the discharge aperture is substantially eliminated.

In some operations, it is desirable that the air draft which rises through the discharge aperture be retarded as little as possible and be diffused more or less uniformly as it approaches the arresting zone of the descending material in the cyclone chamber. As shown in Figure 1, one form of baffle unit for accomplishing this may be constructed wherein the baffle member 59 is composed of wire mesh or of perforate sheet material. In this way the center portion of the rising air stream may pass through the permeable baffle member, without being diverted to an appreciable degree, to pass into the throat of the suction duct while the outer zone portion of the flow will be intercepted by the vanes 57 and caused to whirl in the direction of the main air body in the cyclone chamber as aforesaid. This arrangement is particularly useful in situations wherein the relative buoyancies of the seeds and their waste elements may very nearly approach each other it being necessary here to utilize more gentle drafts in order to prevent large portions of the seeds from being swept into the suction duct. The effect of the screen or perforate sheet baffle member 59 is to cause a slight diversion of the center portion of the rising air draft radially outwardly across the suction duct throat so as to help retain the seeds in a peripheral zone of the cyclone chamber radially beyond the margin of the suction duct where they will stand a greater chance of eventually passing downwardly through the openings between the vanes 57 to be discharged into the collection receiver 18.

Under the conditions, for instance, where the seeds are much heavier in relation to the waste elements, or when considerable chaff is present, it is desirable that the upwardly rising draft through the discharge aperture be concentrated and intensified at the outer peripheral zone of the chamber area lying subjacent to the suction duct throat. In Figure 2 I have shown an impervious sheet metal baffle member 61 rising from the center of the baffle unit and formed with the same general proportions as the previously described perforate baffle members. Here it will be seen that the center area of the baffle unit is blocked off and that all of the rising air draft will be forced to flow upwardly through the deflector vanes 57 and thus be prevented from flowing directly into the suction duct throat. Concentration of the rising air draft into a tubular stream impinging against the descending mass of waste elements, the seeds by this time having more or less concentrated in the outermost zone immediately overlying the inner wall surface of the cyclone chamber, will allow any entrained heavier seeds to sift therethrough, will prevent passage of any of the waste elements downwardly out of the discharge aperture and will have a diversion effect on the waste mass tending to direct the latter radially inwardly into the throat of the suction duct so that the waste elements may be more efficiently and rapidly exhausted from the cyclone chamber.

From the preceding detailed description of my invention it will be seen that I have provided a materially improved cyclone type of separator for the continuous discrimination and disassociation of elements of an airborne mixture, which, by means of its flexibility of adjustment and improved separation effecting means, is capable of efficiently handling large volumes of materials without clogging, is adaptable to operate on a wide range of mixtures, and is capable of delivering a clean separated product more completely free of undesirable waste elements.

I claim:

1. In a cyclone separator having a casing enclosing an axially vertical chamber diminishing cross-sectionally from the upper to the lower end thereof and provided at its upper end with a tangentially entering supply duct and at its lower end with a discharge aperture, means for introducing through said supply duct a sustained flow of air and entrained material to be separated into said chamber to thereafter whirl circumferentially in said chamber whereby heavier components of the mass of material will move outwardly therefrom by centrifugal force to engage a wall of said chamber and whereby said heavier components and the remaining waste elements of said material mass will each move by gravital force toward said discharge aperture of the chamber, a suction duct entering said chamber and having a throat opening disposed in spaced relation to and above said discharge aperture, means for establishing a suction draft in said suction duct to attract and carry into and through said duct said waste elements of the material mass and to induce an upward flow of air from exteriorly of and through the discharge aperture toward the suction duct so as to substantially arrest gravital movement of said waste elements downwardly in the chamber at a plane adjacent to said suction duct throat, and means on said casing adjacent the upper end of said chamber for regulating vertically of said chamber the position of said plane of arrest of said waste elements, said means including a plurality of vent apertures symmetrically located about the axis of said casing and extending radially from adjacent said axis to adjacent the periphery of the casing and shutters pivotally mounted over said apertures to selective open and close said apertures.

2. In a cyclone separator having a casing enclosing an axially vertical chamber diminishing cross-sectionally from the upper to the lower end thereof and provided at its upper end with a tangentially entering supply duct a plurality of symmetrically positioned vent apertures and at its lower end with a discharge aperture, means for introducing through said supply duct a sustained flow of air and entrained material to be separated into said chamber to thereafter whirl circumferentially in said chamber whereby heavier components of the mass of material will move outwardly therefrom by centrifugal force to engage a wall of said chamber and whereby said heavier components and the remaining waste elements of said material mass will each move by gravital force toward said discharge aperture of the chamber, a suction duct entering said chamber and having a throat opening disposed in spaced relation to and above said discharge aperture, means for establishing a sustained suction draft in said suction duct to attract and carry into and through said duct only said waste elements of the material mass and to induce an upward flow of air from exteriorly of and through the discharge aperture toward the plane of the suction duct throat so as to substantially arrest gravital movement of said waste elements downwardly into the chamber at a plane adjacent to said plane of the suction duct throat, means for adjusting vertically the plane of said suction duct throat relative to the respective ends of said chamber, a baffle member carried by said casing and interposed between said discharge aperture and said plane of the suction duct throat for intercepting a portion of said upward flow of air and for directing said intercepted portion of the flow in a whirling movement toward said plane of the suction duct throat and in a direction of rotation substantially equivalent to that of the air and entrained materials in said chamber, and shutters cooperative with and movable to positions of inclination with respect to and to variably open and close said vent apertures for adjustably varying, axially of the chamber, the position of said arresting plane of the waste elements relative to said throat opening.

3. In a cyclone separator having an upper casing enclosing an axially vertical chamber diminishing cross-sectionally from the upper to the lower end thereof and provided at its upper end with a tangentially entering supply duct and with a plurality of vent apertures, an extension casing detachably secured to the lower end of said upper casing and provided with an opening forming a discharge aperture for the chamber, means for introducing through said supply duct a sustained flow of air and entrained material to be separated into said chamber to thereafter whirl circumferentially in said chamber whereby heavier components of the mass of material will move outwardly therefrom by centrifugal force to engage a wall of said chamber and whereby said heavier components and the remaining waste elements of said material mass will each move by gravital force toward said discharge aperture of the chamber, a suction duct entering said chamber and having a throat opening disposed in spaced relation to said discharge aperture, means for establishing a suction draft in said suction duct to attract and carry into and through said duct said waste elements of the masterial mass and to induce an upward flow of air from exteriorly of and through the discharge aperture toward the suction duct so as to substantially arrest gravital movement of said waste elements downwardly in the chamber at a plane adjacent to said suction duct throat, means for adjustably positioning said suction duct throat axially of said chamber and relative to said discharge aperture, shutters cooperative with and movable to positions of inclination with respect to and to variably open and close said vent apertures for admitting regulated amounts of air from the exterior of and into said chamber for adjustably varying, axially of said chamber, the position of said arresting plane of the waste elements relative to said throat opening, a baffle unit detachably engaged with said casing and interposed between said throat opening and discharge aperture, said baffle unit having a frusto-conical pervious central portion confronting and extending toward said suction duct throat for intercepting and modifying a portion of said upward flow of air through the discharge aperture before said air approaches the plane of arrest of said waste material in the chamber, and said baffle unit having radially-extending and upwardly inclined vane members thereon for intercepting a portion of said upward flow of air and to impart to said latter portion of the air flow a rotational movement substantially corresponding to the whirling movement of the air and entrained material in said chamber.

4. In a cyclone separator having an upper casing enclosing an axially vertical chamber diminishing cross-sectionally from the upper to the lower end thereof and provided at its upper end with a tangentially entering supply duct, and with a plurality of vent apertures, an extension casing detachably secured to the lower end of said upper casing and provided with an opening forming a discharge aperture for the chamber, means for introducing through said supply duct a sustained flow of air and entrained material to be separated into said chamber to thereafter whirl circumferentially in said chamber whereby heavier components of the mass of material will move outwardly therefrom by centrifugal force to engage a wall of said chamber and whereby said heavier components and the remaining waste elements of said material mass will each move by gravital force toward said discharge aperture of the chamber, a suction duct entering said chamber and having a throat opening disposed in spaced relation to said discharge aperture, means for establishing a suction draft in said suction duct to attract and carry into and through said duct said waste elements of the material mass and to induce an upward flow of air from exteriorly of and through the discharge aperture toward the suction duct so as to substantially arrest gravital movement of said waste elements downwardly in the chamber at a plane adjacent to said suction duct throat, means for adjustably positioning said suction duct throat axially of said chamber and relative to said discharge aperture, shutters cooperative with and movable to positions of inclination with respect to and to variably open and close said vent apertures for admitting regulated amounts of air from the exterior of and into said chamber for adjustably varying, axially of said chamber, the position of said arresting plane of the waste elements relative to said throat opening, said shutters when open being in positions wherein they are inclined upwardly and counter to the direction of movement of the air and entrained material in said chamber, means connected with said shutters and for moving the latter in unison, a baffle unit detachably engaged with said casing and interposed between said throat opening and discharge aperture, said baffle unit having a frusto-conical pervious central portion confronting and extending toward said suction duct throat for intercepting and modifying a portion of said upward flow of air through the discharge aperture before said air approaches the plane of arrest of said waste material in the chamber, and said baffle unit having radially-extending and upwardly inclined vane members thereon for intercepting a portion of said upward flow of air and to impart to said latter portion of the air flow a rotational movement substantially corresponding to the whirling movement of the air and entrained material in said chamber.

5. Separating apparatus having a casing enclosing an axially vertical chamber and provided at its upper end with a tangentially entering supply duct and at its lower end with a discharge aperture, means for introducing through said supply duct a sustained flow of air and entrained material to be separated into said chamber to thereafter whirl circumferentially in said chamber and whereby said material will move by gravital force toward said discharge aperture of the chamber, a suction duct entering said chamber and having a throat opening disposed in spaced relation to and above said discharge aperture, means for establishing a suction draft in said suction duct to attract and carry into and through said duct lighter components of the material mass and to induce an upward flow of air from exteriorly of and through the discharge aperture toward the suction duct, and means defining a plurality of vent apertures symmetrically located about the axis of said casing and extending radially from adjacent said axis to adjacent the periphery of the casing, and shutters mounted over said apertures to selectively open and close said apertures.

6. In a separator having a casing enclosing an axially vertical chamber and provided at its upper end with a tangentially entering supply duct and at its lower end with a discharge aperture, a suction duct entering said chamber and having a throat opening disposed in spaced relation to and above said discharge aperture, and means defining a plurality of vent apertures symmetrically disposed about the axis of said casing and extending radially from adjacent said axis to adjacent the periphery of the casing, shutters pivotally mounted over said apertures, and means for releasably securing said shutters in selected positions of rotation.

ELWIN V. GORDON.

References Cited in the file of this patent

UNITED STATES PATENTS

| Number | Name | Date |
|---|---|---|
| 387,617 | Ash | Aug. 14, 1888 |
| 458,733 | Lee | Sept. 1, 1891 |
| 1,122,371 | Douglas | Dec. 29, 1914 |
| 1,383,984 | Clark | July 5, 1921 |
| 1,719,119 | McKain | June 2, 1929 |
| 1,917,310 | Lesage | July 11, 1933 |
| 1,922,316 | Moulding et al. | Aug. 15, 1933 |
| 2,437,592 | Brown | Mar. 9, 1948 |

FOREIGN PATENTS

| Number | Country | Date |
|---|---|---|
| 362,723 | Great Britain | Dec. 10, 1931 |
| 460,336 | Germany | May 23, 1928 |